(12) United States Patent
Delattre et al.

(10) Patent No.: US 8,949,412 B2
(45) Date of Patent: Feb. 3, 2015

(54) METHOD FOR MANAGEMENT OF DATA STREAM EXCHANGES IN AN AUTONOMIC TELECOMMUNICATIONS NETWORK

(75) Inventors: Michel Delattre, Boulogne Billancourt (FR); Bernard Imbert, L'Etang la Ville (FR)

(73) Assignee: IPanema Technologies (FR)

( * ) Notice: Subject to any disclaimer, the term of this patent is extended or adjusted under 35 U.S.C. 154(b) by 535 days.

(21) Appl. No.: 13/148,186

(22) PCT Filed: Feb. 3, 2010

(86) PCT No.: PCT/EP2010/051281
§ 371 (c)(1),
(2), (4) Date: Aug. 5, 2011

(87) PCT Pub. No.: WO2010/089316
PCT Pub. Date: Aug. 12, 2010

(65) Prior Publication Data
US 2012/0023213 A1   Jan. 26, 2012

(30) Foreign Application Priority Data
Feb. 5, 2009 (FR) .................................. 09 50724

(51) Int. Cl.
*G06F 15/173* (2006.01)
*H04L 12/801* (2013.01)
(Continued)

(52) U.S. Cl.
CPC ................ *H04L 47/10* (2013.01); *H04L 41/16* (2013.01); *H04L 47/20* (2013.01)
USPC .......................................... 709/224; 709/238

(58) Field of Classification Search
CPC ................... H04L 47/10; H04L 47/18
USPC ........... 709/223–226, 238–244; 370/229, 238
See application file for complete search history.

(56) References Cited

U.S. PATENT DOCUMENTS 6,738,349 B1 * 5/2004 Cen ................................ 370/231
7,639,613 B1 * 12/2009 Ghannadian et al. ......... 370/232
(Continued)

FOREIGN PATENT DOCUMENTS

| WO | 02/05141 | 1/2002 |
|---|---|---|
| WO | 2005046145 | 5/2005 |

OTHER PUBLICATIONS

Mikhail Smirnov, Autonomic Communication, PGNet 2005, Liverpool John Moores University, Jun. 27, 2005 pp. 1-62.
(Continued)

*Primary Examiner* — Joseph E Avellino
*Assistant Examiner* — James Conaway
(74) *Attorney, Agent, or Firm* — Baker Hostetler LLP

(57) ABSTRACT

A method for managing data stream exchanges in an autonomic telecommunications network including a first phase consisting in extracting from each stream routing data and data for measuring the transfer function between at least one data producer Pi and at least one data consumer Cj, sharing the extracted routing data between processing and decision-making functional modules distributed across the said network, selecting at least one decision-making or processing module for which the access time to the measuring data of the transfer function is minimal, dynamically defining by at least one of the selected modules the said rules for optimizing the transfer settings of the stream according to the said measuring data and distributed over the said network select processing modules located on the path of the said streams in order to apply the said rules.

13 Claims, 4 Drawing Sheets

Figure 1:
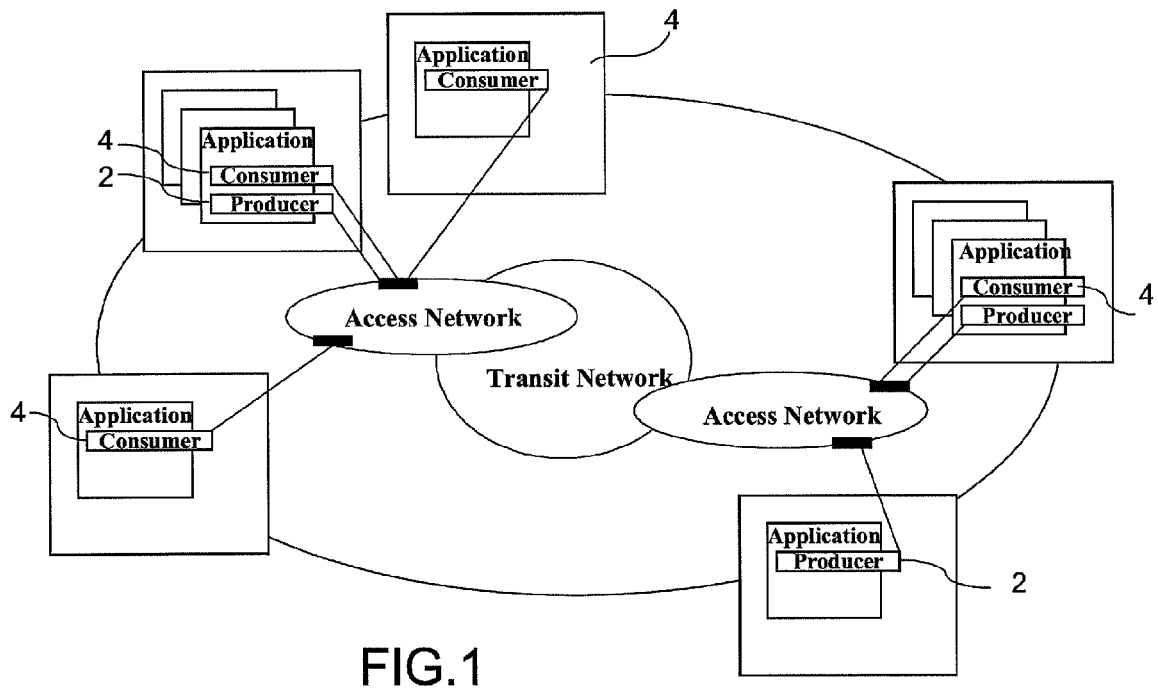

(51) Int. Cl.
*H04L 12/24* (2006.01)
*H04L 12/813* (2013.01)

(56) References Cited

U.S. PATENT DOCUMENTS

| | | |
|---|---|---|
| 2001/0019554 A1 | 9/2001 | Nomura et al. |
| 2005/0122900 A1* | 6/2005 | Tuulos et al. ............... 370/229 |
| 2005/0138204 A1* | 6/2005 | Iyer et al. .................... 709/242 |
| 2006/0002312 A1* | 1/2006 | Delattre et al. ............. 370/254 |
| 2006/0253566 A1* | 11/2006 | Stassinopoulos et al. .... 709/224 |
| 2008/0275985 A1* | 11/2008 | Kundu ........................ 709/224 |
| 2010/0153537 A1* | 6/2010 | Wang et al. .................. 709/224 |
| 2010/0188976 A1* | 7/2010 | Rahman et al. .............. 370/235 |
| 2012/0023213 A1* | 1/2012 | Delattre et al. .............. 709/223 |
| 2013/0254833 A1* | 9/2013 | Nicodemus et al. ............ 726/1 |
| 2014/0006614 A1* | 1/2014 | BALI et al. ................... 709/224 |

OTHER PUBLICATIONS

Simon Dobson, A Survey of Autonomic Communications, vol. 1, No. 2, Dec. 2006, pp. 223-259.

Ludovic Noirie, Self-* Features for Semantic Networking, Intl. Workshop on Traffic Management & Traffic Engineering for the Future Internet, 2008, pp. 1-8.

* cited by examiner

METHOD FOR MANAGEMENT OF DATA STREAM EXCHANGES IN AN AUTONOMIC TELECOMMUNICATIONS NETWORK

TECHNICAL FIELD

The invention is in the field of telecommunications networks and concerns more specifically a method for managing data stream exchanges in an autonomic telecommunications network including a central module intended to establish a global policy defining the rules for transfer of streams in said network between multiple data producers $P_i$ and multiple data consumers $C_j$ connected to the network via multiple means of access distributed across said network, where the means of access include at least one module for processing the data streams intended to optimise the settings of stream transfer over the network, and at least one decision-making module intended to define dynamically rules for optimising the transfer settings. This method also includes steps performed by at least one module located between at least one data producer $P_i$ and at least one data consumer $C_j$ for observing said streams located The invention also concerns a device intended to implement the method according to the invention.

STATE OF THE PRIOR ART

Data transfer in a network requires the deployment of switching or routing for equipment routing the information from a source to a destination through transmission means, and functions for adapting the data such that it occupies the least possible resources, and that it maintains the stream transfer characteristics despite competition between streams, together with functions to control routing and to adapt in order to deliver an optimum and secure transfer service.

To perform these functions additional systems for managing resources, optimising and filtering are added to the routing devices to establish complex stream recognition mechanisms (Deep Packet Inspection, etc.), mechanisms for measuring performance, for optimising transfer efficiency, and for adapting the means of transfer to suit requests by means of global rules.

These devices contain:
observation modules consisting of probes to observe the streams,
processing modules consisting of actuators to modify the transfers of the streams in order to attain performance and security goals.
Decision-making modules to define rules for optimising the settings for transferring the streams through the network.

These additional devices are located on the data paths, and the greater the network area covered, and the better equipped the area, the greater their efficiency.

In the first generations of networks these devices have action coordinated by initial consistent rules calculated during a network planning phase, and the observations are collected to judge the relevance and efficiency of the plan. Collection is made at a central point located in a central management system responsible for correlating all the observations to construct an overview of the system. Adjustment phases enable new rules consisting of a new plan to be redistributed in order to upgrade the system according to the forecasts for requirements and the results obtained in the previous plans.

The central system distributes operating rules (policies) by control streams to the network elements responsible for applying these rules. These generate events and give read access to states which are collected by the central system in management streams.

The network resources are therefore shared between the data streams which traverse the network and the control and management streams which contribute to the satisfactory operation of the network's transport service.

Current telecommunications networks face a high degree of convergence, where specialisation has given way to a unified data transport service which is more flexible, more efficient and less costly.

This development is introducing extreme variability of the types of transfer which these networks must process. It thus becomes essential to adapt data transfer stream-by-stream, to coordinate these adaptations so as to discover a predictable global behaviour for each application, and to dynamically arbitrate competition between applications in accordance with operational goals.

It becomes necessary to move from a set of simple devices orchestrated from a central system to a set of devices which are able to act with the "stream" granularity, and with response times compatible with close control systems between means of transfer and the applications' transfer requests.

This change encounters the following problems:
increased volume of additional data to be exchanged to coordinate a distributed control system,
slowness of the convergence of the distributed actions,
complexity of the systems to be distributed.
difficulty of adaptation to malfunctions bearing in mind the complexity of the systems to be distributed, change of topology, and diversity of the applications exchanging data streams.

Various improvements have been made to limit the impact of scaling-up. An example is given by patent (WO/2002/005141) NETWORK MANAGEMENT ARRANGEMENT WITH QUERY AGGREGATION, where an organisation for data collection allows more efficient aggregation of the streams, thus reducing the volume of control and management data, and distributing the control and management streams over several paths.

However, due to the slowness of the "data collection—decision-making—dissemination of control and management data" circuit, the system described in this document does not allow rapid changes of environment to be managed.

A first aim of the invention is to compensate for the disadvantages of the prior art by means of a method and an autonomic architecture enabling heterogeneous elements which are completely remotely controlled from a uniform autonomic core to be brought together in a single ANA (Autonomic Network Architecture) network.

It should be recalled that autonomic networks have functional blocks (FBs) implemented in nodes of the ANA network, and compartments which group together FBs on the basis of rules enabling a service to be provided, and also enabling communication resources to be associated dynamically between the FBs.

One problem of known autonomic networks derives from the fact that the FBs which comprise them do not cooperate with one another, information stream by information stream, to minimise the management stream exchanges.

Another aim of the invention is therefore to enable an autonomic network to be organised permanently on the basis of the observed streams, and not on the basis of rules defined in advance, and managed centrally.

An example of an application of autonomic system principles to traffic management was presented at the "International Workshop on Traffic Management and Traffic Engineering for the Future Internet (FITraMEn 2008)".

The implementation of such principles is confronted with problems due to the complexity of the distributed algorithms and to the variety of the autonomic agents, which leads to a difficulty in scaling-up due to the fact that the autonomic agents must share knowledge representing a volume of information changing on an N×N basis, where N is the number of autonomic agents of the same level. They must converge towards a consistent vision allowing consistent decisions to be taken. This requires that the shared knowledge is reduced to the minimum necessary for taking local decisions (principle of myopia).

The complexity of the distributed algorithms derives from the fact that the data exchanged by the autonomic agents is propagated with a certain transmission delay, and a certain probability of offset timing requiring costly context transfers.

In addition, although the manufacturers of equipment easily reach agreements concerning standardised interfaces and protocols, it is difficult to model an autonomic agent having multiple interactions with its counterparts, and having multiple levers of action and observation.

A third aim of the invention is to provide a hierarchical system in which the observation modules consist of simple devices such as traditional switching/routing facilities which constitute the basis of the networks, not requiring any prior knowledge of their counterpart, any mechanism for exploration of their neighbourhood, or any prior knowledge of the predefined rules for managing stream transfers via the network.

ACCOUNT OF THE INVENTION

The aims of the invention are attained by means of a method for managing data stream exchanges in an autonomic telecommunications network including a central module intended to establish a global policy defining the rules for transfer of streams in the said network between multiple data producers $P_i$ and multiple data consumers $C_j$ connected to the said network via multiple means of access distributed across the said network, where the said means of access include at least one module for processing the said streams intended to optimise the settings of the stream transfer over the network, and at least one decision-making module intended to define dynamically rules for optimising the said transfer settings.

The method according to the invention includes a first phase consisting in:

a—extracting through the processing modules of each stream exchanged across the network routing data and measuring data of the transfer function between at least one data producer $P_i$ and at least one data consumer $C_j$, b—sharing the extracted routing data between the decision-making modules, c—selecting at least one decision-making module or at least one processing module for which the access time to the measuring data of the transfer function is minimal, and a second phase consisting in:

d—dynamically defining by means of at least one of the selected modules the said rules for optimising the stream transfer settings according to the said measuring data, e—selecting processing modules located on the path of the said streams in order to apply the said rules such that the stream transfer function is made consistent with the global stream exchange policy defined by the central module.

f—applying the said rules by the modules selected in step e).

According to another characteristic of the invention, steps a) and f) are executed by at least one observation module of the said streams, situated between at least one data producer $P_i$ and at least one data consumer $C_j$, where the said observation module is either the first module traversed by this stream since the producer of this data stream $P_i$, or the last module traversed before reaching the consumer of this data stream $C_j$.

The said observation module is either the first module traversed by this stream from the producer of this data stream $P_i$, or the final module traversed before attaining the consumer of this data stream $C_j$.

Preferentially, for a given observed stream, the said processing or observation modules selected in step e) are the first module traversed by the stream observed from its producer, and the final module traversed by the said stream before reaching the consumer.

In addition, the processing module filters the streams exchanged in the network according to a security policy defined by the central module.

In a first variant implementation of the method according to the invention, if the observed stream traverses only a single processing or observation module between the data producer $P_i$ and the data consumer $C_j$, then step e) consists in selecting the single module traversed by the said stream.

According to the invention, the processing module extracts characteristic data from the observed stream such as the behavioural signature, metrics, identification data, and directly modifies the transfer settings of the said stream according to the extracted characteristic data, the decision-making module collects the characteristic data of the said stream extracted by the modules selected in step e, and processes the said data to detect changes requiring new action rules to be defined which must be imposed on the said selected module, or to be distributed to the other decision-making modules in order for decisions to be made in relation to other streams, and the observation module performs at least one of the following functions:

exchanging routing and measuring data with the decision-making modules and the processing modules, recognising starts and ends of streams, calculating a signature associated with a data packet, temporarily storing headers of data packets and time-stamped signatures, calculating elementary metrics of the exchanged stream, adapting the said stream using rules defined dynamically by the decision-making module.

In addition, the said processing module extracts characteristic data from the said stream, such as the behavioural signature, metrics and identification data, and directly modifies the transfer settings of the said stream according to the extracted characteristic data.

Preferentially, the action of the processing module includes at least one of the following operations:

filtering the said stream, selecting an output interface for the said stream, configuring the said stream in terms of the sequencing of the streams, compressing the said stream, modifying the protocol elements to accelerate the transfer of the said stream.

The method according to the invention enables the roles between the observation modules, the processing modules and the decision-making modules to be distributed dynamically, stream-by-stream, so as to:

minimise the control data which must be exchanged, take action decisions from the device which accesses most rapidly the data required to take the decision.

The method according to the invention is implemented by means of a device for managing data stream exchanges in an autonomic telecommunications network including a central module intended to establish a global policy defining the rules for transfer of streams in the said network between multiple data producers $P_i$ and multiple data consumers $C_j$ connected to the said network via multiple functional elements distributed across the said network, where the said functional elements include at least one module for processing the said streams intended to optimise the settings of the stream transfer over the network, and at least one decision-making module intended to define dynamically rules for optimising the said transfer settings.

In addition, the device according to the invention includes modules for observing the said streams situated between at least one data producer $P_i$ and at least one data consumer $C_j$.

The device according to the invention includes:

a—means for extracting from each stream exchanged across the network routing data and measuring data of the transfer function between at least one data producer $P_i$ and at least one data consumer $C_j$, b—means for sharing the extracted routing data between the decision-making modules, c—means for selecting at least one decision-making module or at least one processing module for which the access time to the measuring data of the transfer function is minimal, d—means for allowing at least one of the selected modules to define dynamically the said rules for optimising the transfer settings of the streams according to the said measuring data, and e—means for selecting processing or observation modules located on the path of the said streams in order to apply the said rules such that the stream transfer function is made consistent with the global stream exchange policy defined by the central module.

In a preferred embodiment the modules for observing streams are incorporated in the network's routing equipment, and include:

means for exchanging data with all the decision-making modules and all the processing modules,
means for recognising the starts and ends of each stream traversing them,
means for calculating a packet signature,
means for temporarily storing packet headers and time-stamped signatures,
means for calculating the stream's elementary metrics,
means for adapting the streams traversing them according to elementary rules established dynamically for each stream by the decision-making modules and the processing modules.

In addition, the said modules for observing streams are able to supply the data extracted from a stream traversing them in response to a request of a decision-making or processing module, and to receive back from this requesting module settings for processing the said stream, and the said decision-making modules are able to synchronise themselves with one another in order to constitute a shared database which can be interrogated by all the decision-making modules and all the processing modules distributed over the network.

Furthermore, the decision-making modules and the processing modules are capable of interacting to coordinate their respective actions, and to take decisions stream-by-stream.

In the preferred embodiment, the observation modules and the processing modules each have a first interface and a second interface, both of which are adapted such that the streams enter an observation module or a processing module via the first (respectively the second) interface, and exit from the observation module or the processing module via the second (respectively the first) interface, and such that the origins (respectively the destinations) of the streams are associated with the said observation modules and the said processing modules by self-learning or by configuration rules.

The presence in the device according to the invention of multiple data collection and decision-making loops enables hierarchical organisation of the decisions (micro-decision, global decision) to be ensured within a distributed autonomic network. The impact of scaling-up is thus reduced for the aspects concerning speed of action and fineness of the actions, by means of micro-decisions taken in autonomic fashion by the decision-making modules distributed across the network.

Moreover, the simplicity of the observation modules enables these devices to be included in all the switching/routing equipment constituting the basis of the network.

The method and the device according to the invention enable the operational principles of the autonomic networks to be deployed on a large scale, and at low cost, thus giving such networks flexibility of deployment, and simultaneously allowing the processing capacities, which can be installed gradually over time, and the management operations required for configuring these networks, to be optimised.

BRIEF DESCRIPTION OF THE ILLUSTRATIONS

Figure 2:
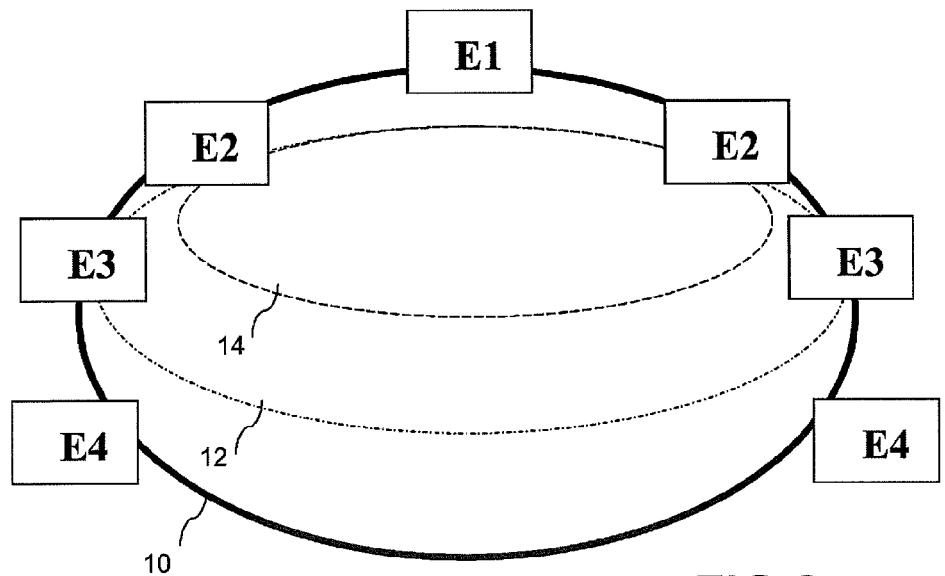
Figure 3:
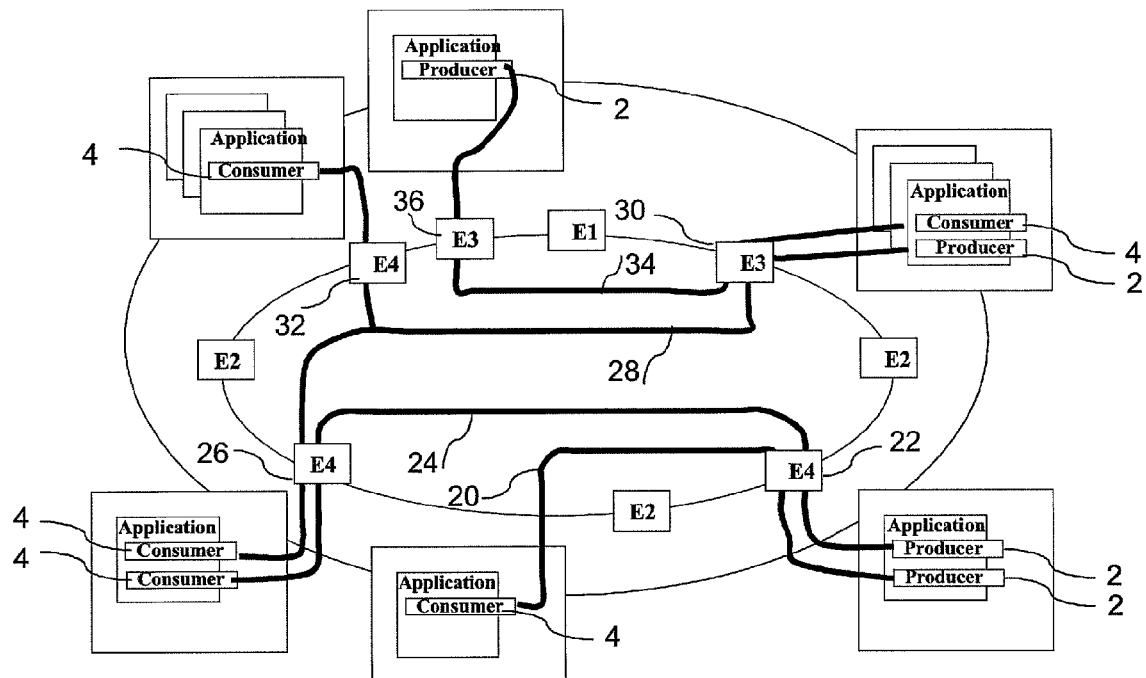
Figure 4:
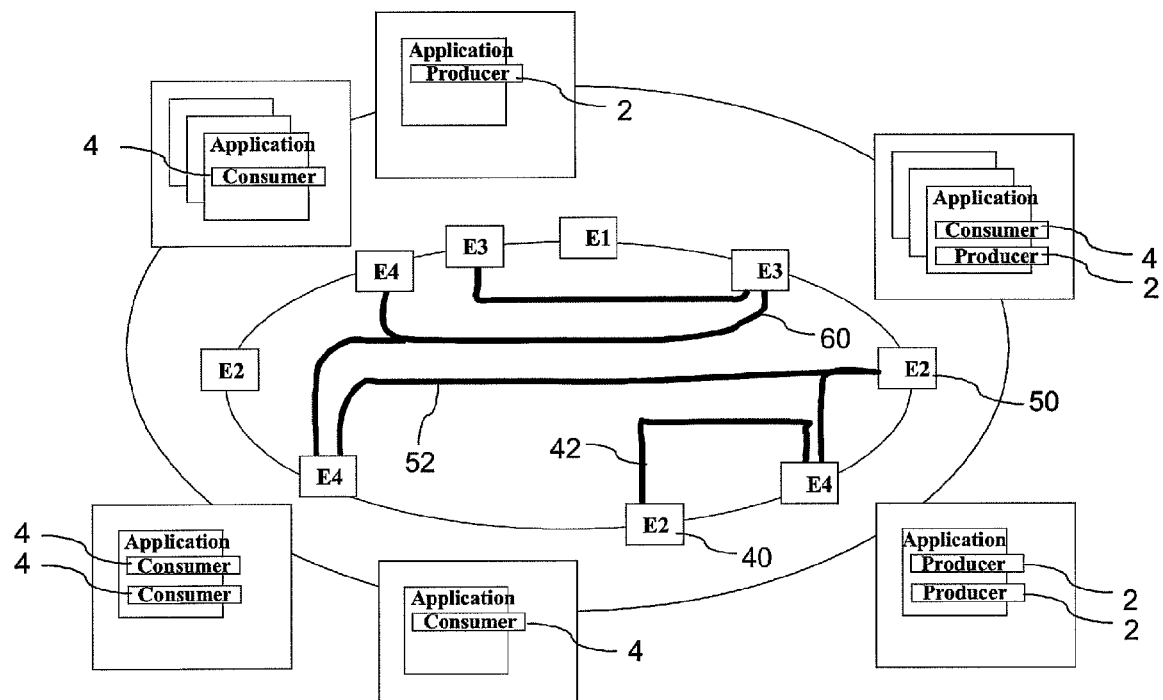
Figure 5:
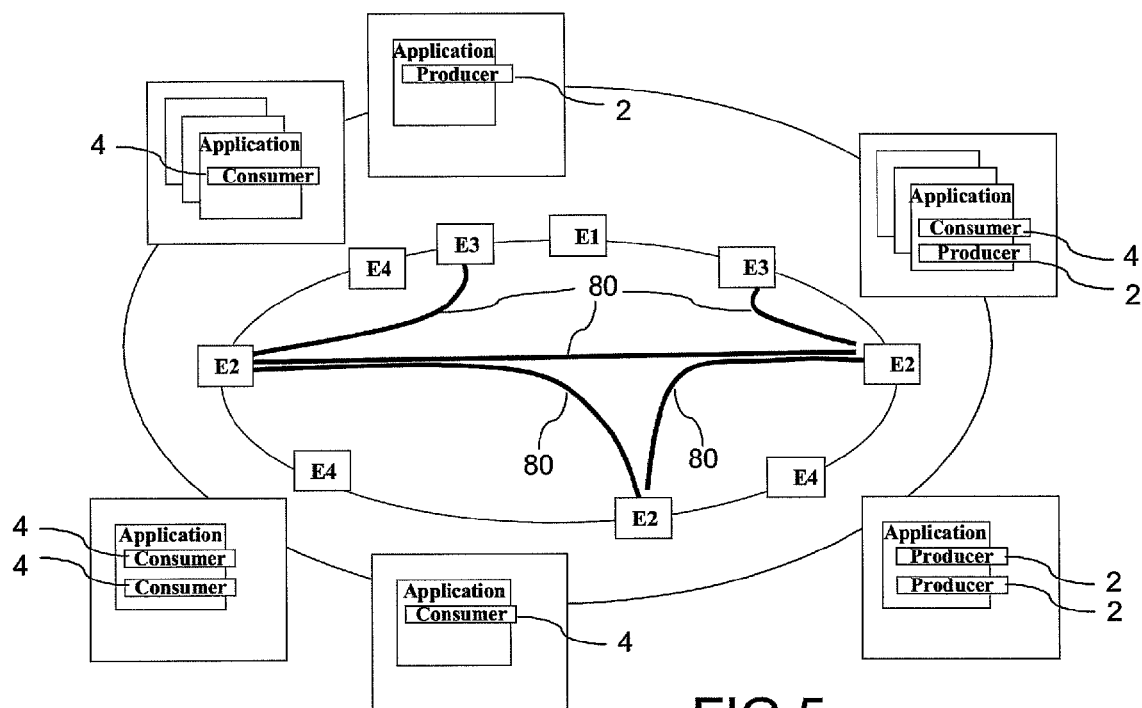
Figure 6:
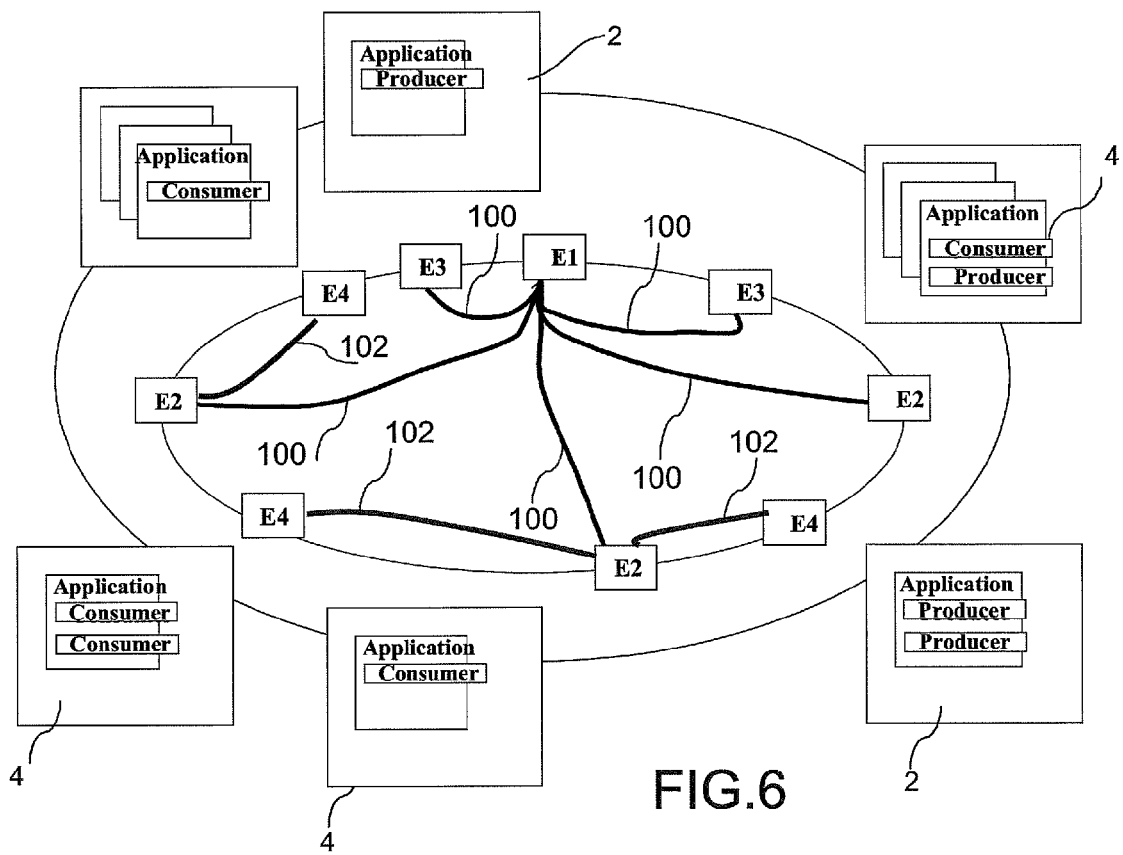
Figure 7:
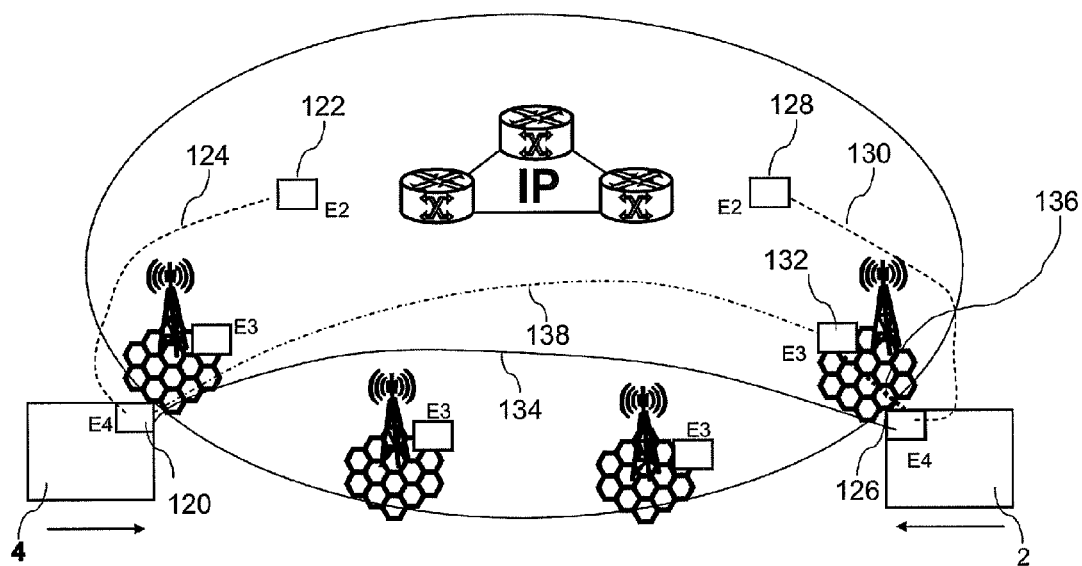

Other characteristics and advantages of the invention will become clear from the following description, which is given as a non-restrictive example, with reference to the appended figures, in which:

FIG. 1 represents a general diagram of the information system distributed around a network in which the distributed control method according to the invention is implemented FIG. 2 illustrates diagrammatically the interaction of the distributed functional elements in an autonomic network according to the invention, FIG. 3 represents examples of streams processed by the stream management method according to the invention, FIG. 4 represents an example of dynamic associations of functional elements to optimise the stream control data exchanges shown in FIG. 3, FIG. 5 represents the knowledge distribution connections required for coordination of the functional elements in an autonomic network according to the invention, FIG. 6 represents the initial settings distribution connections between the functional elements distributed in an autonomic network according to the invention, FIG. 7 represents an example of a selection of the modules according to the invention for which the access time to the measuring data of the transfer function is minimal.

DETAILED ACCOUNT OF PARTICULAR EMBODIMENTS

The following definitions will be used in the remainder of the description:

A data Producer is a participant of the communication network which delivers data using the Means of transfer.

A data Consumer is a participant of the communication network which accesses information delivered by a data Producer using the Means of transfer.

A transit network represents a transport capacity used during data transfers between data Producers and data Consumers, and is highly shared between multiple network application participants (machines or individuals).

The means of access are means implemented to put each network application participant into relation with the transit network.

A functional element is a software and/or hardware module performing a set of functions. It may be a processing module, a decision-making module or an observation module.

A processing module E3 is a functional element which can observe (extract data such as the behavioural signature, metrics and identification) and modify (filter, select an output interface, configure the stream in terms of the stream sequencing, compress, modify the critical elements in order to accelerate, etc.) the data streams directly.

A decision-making module E2 is a functional element which can collect data extracted by processing points, and process this data in order to detect changes requiring that new rules of actions are moved to the processing points.

The processing modules E3 and the decision-making modules E2 constitute the core of the autonomic network.

An observation module E4 is an element which is added to the core of the autonomic network, and is differentiated from the processing and decision-making modules by processes simplified according to dynamic processing settings, stream-by-stream, which are supplied to it by the processing module and/or by the decision-making module.

An Application of the communication network is defined by a set of participants having roles of Producers and Consumers, by the nature of the data transferred by the Producers and the Consumers, and by the nature of the use to which the data is put by the Consumers.

The elements of a data stream known as packets include a means of knowing the destination and origin of the stream, and also of determining the start and end of a stream.

The transfer function of a data stream characterises at each instant the impact of the Means of transfer on the delivery of data to the Consumers.

The network illustrated by FIG. 1 includes multiple data producers $P_i$ 2, multiple data consumers $C_j$ 4, and means of transfer of the said data between the said producers 2 and the said consumers 4 in a multiple applications context $A_k$.

In the remainder of this description the means of transfer designate all the mechanisms enabling delivery of data according to an exchange protocol defined between producers 2 and consumers 4, where the term communication designates both the transfer of data and the protocol for exchange between communicating entities, or between communicating entities and intermediaries.

Data Consumption within the communication network represents all the data which can be used by the Consumers, and delivered by the producers 2 at each instant.

The producers 2 and the consumers 4 are considered in the sense of applications using software and/or hardware resources with a view to providing the end consumer with a service.

The applications can be multimedia communication applications, such as telephony, videophony, videoconferencing, multimedia distribution applications such as video-on-demand, broadcasts, content syndications, consultation applications such as directories, WeB interactive services, information-sharing applications such as peer-to-peer exchanges, distributed databases and, generally, computer applications the elements of which are executed on remote machines and which are synchronised with one another and exchange data across the network.

In FIG. 2 four sets of functional elements E1, E2, E3 and E4 are illustrated, representing respectively a central module intended to establish a global policy defining the transfer rules of the streams in the network, a decision-making module, a processing module and an observation module. Functional elements E1, E2, E3 and E4 are distributed in the network according to a hierarchical architecture including multiple concentric circuits 10, 12 and 14 representing connections between functional elements E1, E2, E3 and E4.

The first circuit 10 connects all the functional elements of the network to enable the central module E1 firstly to provide the global rules for operation to the modules E2, E3 and E4, and secondly to collect data produced by these modules E2, E3 and E4 following a transfer of a data stream between a data producer and a data consumer.

The global policy consists in defining global performance and security goals and consistent arbitration rules to be applied in the event of competition between streams for the use of network resources.

Central module E1 intervenes neither in the processing of the exchanged data streams, nor in the coordination, stream-by-stream, of the actions undertaken by the modules E2, E3 and E4.

The second circuit 12 connects the decision-making modules E2 to the processing modules E3 in order to enable these modules to exchange stream control data to enable these modules to coordinate their actions and to take decisions, stream-by-stream. As an example, this circuit enables the decision-making modules E2 and the processing modules E3 to cooperate to select an optimum path which the stream must take, to measure end-to-end characteristics of streams, such as time taken, jitter and the loss rate of packets, to determine dynamically consistent rules for configuration of streams, to configure the methods of compression and acceleration, and to implement a security policy. In this process, each of the decision-making modules E2 and the processing modules E3 can act only as a decision-making point, but not necessarily as processing points. When a stream starts, implicit rules select one of these modules to be the decision point of the actions undertaken on a stream.

The third circuit 14 connects the decision-making modules E2 to enable the latter to produce a time reference, a consistent distributed database, and synchronised data caches. It also enables the stream matrix allowing determination, from any decision-making module E2, of the processing E3 or observation E4 modules traversed by a stream identified by the packet header fields to be constituted, by learning.

To this end, the decision-making modules E2 include a function for distributing dynamic settings required for consistency of the actions.

The observation modules E4 are added to the network in the first circuit 10 to provide the data extracted from the processed transfer of a stream at the request of a decision-making module E2 and to receive by return from this decision-making module the settings required for processing the streams which traverse them.

To this end, the observation modules E4 include:
means for exchanging data with all the known processing modules E3 and decision-making modules E2,
means for recognising starts and ends of streams,
means for calculating a packet signature,
means for temporarily storing packet headers and time-stamped signatures,
means for calculating elementary "stream" metrics,
means for adapting streams according to the various inherent means available to them on the basis of the elementary rules established dynamically for each stream by the processing modules E3 or by the decision-making modules E2.

Intrinsically, the observation modules E4 do not have the means to classify the streams finely. They cannot recognise the applications at the origin of these streams, such as voice, video or file transfer, by an analysis of the content of the packets and of the packet sequences, enabling, for example, access to a known WeB server to be recognised. If there are no directives from elements E2 and E3, the observation modules E4 apply static rules corresponding to the plan distributed by the central element E1.

The number of decision-making and processing modules E2, E3, and the distribution and positioning of these modules in the network's physical architecture, can be adjusted in order to achieve the ideal cost-service compromise delivered. A low-cost deployment can use a set of modules E4 incorporated into the network's routing equipment and a central unit containing a central module E1 and a decision-making module E2. Better performance is obtained by placing processing modules E3 on the periphery of the network, or at the base of the means of access, or again at the point where the collection networks join the transit network.

The method according to the invention applies, as an example, in a virtual corporate network including access equipment such as modems, routers, or all other LAN/WAN demarcation equipment. Some of this equipment will perform the observation module functions E4, whereas other equipment will be dedicated to the functions of the decision-making modules E2, or to those of the processing modules E3. The latter will be inserted in the central sites and will be able to perform both processing functions and decision-making functions, or only decision-making functions, without going beyond the scope of the invention.

The method according to the invention can also be implemented in an operator's points of presence which can include equipment dedicated to the functions of the processing modules E3 and/or decision-making modules E2 interacting with one another to form an autonomic network core which remotely controls the access equipment such as the modems, routers, or all other LAN/WAN demarcation equipment functioning as observation modules E4.

The method according to the invention can also be implemented in a Radio access network using 3GPP (3rd Generation Partnership Project) in which the Radio stations called NodeBs could perform the functions of the observation modules E4, and including decision-making modules located in the gateway to the access Network. The latter can be processing modules E3 and/or decision-making modules E2 interacting with other processing modules E3 and/or decision-making modules E2 deployed in the private virtual networks.

FIG. 3 shows an example of a control stream flow between stream producers 2 and consumers 4 in an autonomic network according to the invention, in which a first data stream 20 traverses a single observation module 22, a second data stream 24 traverses the observation module 22, and another observation module 26, these observation modules being located either side of a network portion where the transfer function will be controlled, a third data stream 28 from a producer 2 to two consumers 4 traverses the observation module 26, a processing module 30 and another observation module 32, and where a fourth data stream 34 traverses the processing module and a second processing module 36.

FIG. 4 shows the control connections which are established with each stream start between the various functional elements distributed in the network.

Observation module 22 gives the decision-making module 40 data extracted from the data stream 20. Decision-making module 40 sends the observation module 22 the data required for the control of the transfer of the data stream 20 in a first control stream 42.

Observation modules 22 and 26 located on the path of data stream 24 provide decision-making module 50 with data extracted from data stream 24. Decision-making module 50 produces dynamic rules for configuration of the means of transfer on the basis of the data it receives and of the global knowledge of the state of the network resources received via circuit 14 from the other processing and decision-making modules distributed in the network, and sends the observation modules 22 and 26 the data required for the control of the data stream transfer 24 in a second control stream 52. Observation modules 22 and 26 apply the rules produced dynamically by decision-making module 50.

Observation modules 26 and 32 located on the path of data stream 28 provide processing module 30 with data extracted from data stream 28.

Processing module 30 produces dynamic rules for configuration of the means of transfer on the basis of the data it receives and of the global knowledge of the state of the network resources received via circuit 14 from the other processing and decision-making modules distributed in the network, and sends the observation modules 26 and 32 the data required for the control of the data stream transfer 28 in a second control stream 60. Observation modules 26 and 32 apply the rules produced dynamically by decision-making module 60.

Processing modules 30 and 36 located either side of a network portion where the transfer function of the data stream 34 will be controlled, are coordinated and exchange control data to act locally on this data stream 34 according to the global knowledge of the state of the network resources received via circuit 14 on the basis of the other processing and decision-making modules distributed in the network.

The method according to the invention takes advantage of the ubiquity of packet mode communication networks. And of the fact that all the functional elements of the autonomic network can establish between themselves, dynamically, control connections across the network. A control stream has a lifetime equivalent to the data streams. These control streams consume minimal network resources compared to the data streams due to the choice of locating decision-making modules as close as possible to the processing points, and due to the optimisation of this stream-by-stream control plan.

Moreover, optimisation of the control plan, stream-by-stream, ensures that actions are relevant and that the control data is accurate, whilst reducing the transfer times of the control data.

FIG. 5 shows the connections 80 conveying the data over streams observed by observation modules E4 and transmitted by these observation modules E4 to the decision-making modules E2 and processing modules E3, which thus share a knowledge of the states of the network resources. These connections are established and discontinued with each insertion (respectively with each removal) of a decision-making module E2 in the (respectively from the) network. The decision-making modules E2 are synchronised with one another to ensure consistent distribution of the states of the network. Each processing module E3 is attached to one of the decision-making modules E2 to provide the states which they produce, and to receive the states they require in order to take decisions concerning the processing of a stream transfer. The various distributed modules E2/E3 thus have robust access to shared common knowledge. This shared knowledge may include the flow rules learnt by observation of the streams by all the modules E2/E3/E4. These rules enable the control plan illustrated in FIG. 4 to be constructed dynamically, stream-by-stream.

FIG. 6 shows the 100 connections which central module E1 has with each functional element in the network. These connections 100 are extended by connections 102 to reach the elements E4 via the elements E2. These connections are established and discontinued with each insertion/removal of an element E2/E3/E4 in the network. The central module E1 controls these insertion/removal operations, and thus guarantees that the system is consistent. It provides the global operational rules and collects the data produced by the functional elements distributed in the network.

FIG. 7 shows observation modules 120 and 126 which extract routing data from each stream exchanged between consumers 2 and producers 4 across the network. This routing data is supplied to the decision-making modules 122 and 128 respectively by the connections 124 and 130. When an information stream 134 is established between a producer 2 and a consumer 4, the observation modules 120 and 126 detect the start of this stream and inform the decision-making modules 122 and 128. To manage the transfer function of stream 134, in a first phase, the decision-making modules 122 and 128 select a processing module 132, which is not precisely on the path of stream 134, but which will be given the task of extracting the characteristic data whilst correlating the measuring data continuously produced by observation modules.

In a second phase, the decision-making modules 122 and 128 select the 2 observation modules 120 and 126 located, respectively, as close as possible to the producer and to the consumer. Selected processing module 132 has fast access to the data produced by observation module 126. It dynamically establishes control connections 136 and 138 with, respectively, observation modules 120 and 126, and modifies directly the transfer settings of the stream 134, according to the extracted characteristic data.

In the context of this distributed control/command system of a communication Network R, the present invention provides a method for extending this system to elements E4 known as affiliated elements.

The method according to the invention is characterised by an approach in four steps:
a—an insertion of a functional element in the network, verified by the central element E1,
b—matching of the inserted functional element with a decision-making module E2 enabling the data extracted from the processed information transfers to be moved on the fly,
c—dynamic, stream-by-stream matching of the inserted functional element, initialised from a decision-making module E2 or from a processing module E3, using the data obtained by step b, and enabling extracted data required for the distributed control to be moved on the fly,
d—stream-by-stream alignment of the data transfer processing settings with settings taken from the processing of the data obtained in step c.

Step a consists in introducing an observation module E4 in the autonomic network. It can be accomplished by pre-configuration of the network, or by an exploration procedure, and include authentication procedures. The transition to step b can result from with procedures to distribute the loads of the decision-making modules E2 [?].

Step b provides the functional elements with the means of knowing the dynamic flow settings of the streams in the network. It may consist of a logical connection with the decision-making module E2 initialised by this decision-making module E2 during which the latter sends the observation modules E4 orders, and the said observation modules E4 send back responses to the orders received.

These despatches concern event-related or periodic data enabling the decision-making module E2 to know the dynamic flow settings of the streams in the network.

These settings include the end-to-end flow rules learnt by simple observation of the streams, enabling an addressee processing point to be predicted from a source processing point.

It should be recalled that, in every packet mode network, the packets of a stream include means of designating the origin and addressee of the stream enabling the observation modules E4 to provide their stream origin and destination observations to the decision-making modules E2.

On the basis of this information the decision-making modules E2 can maintain a shared database which can be interrogated from the decision-making modules located in the processing modules E3 or in the decision-making modules E2. This database could also be constructed by static rules provided by the central module E1.

During operation, when a new stream is detected by an observation module E4, a decision-making module E2 or a processing module E3 uses the stream origin and/or destination data to seek in the database the decision-making modules E2 or processing modules E3 or observation modules E4 which have a satisfactory probability of being on the path of the stream, and in order to select the functional element closest to the consumer/producer. It can then initialise step c.

In step c the observation modules E4 collect from a decision-making module the data extracted from a stream in one or two stream processing points.

Among the extracted data the packet signatures and the transfer time readings can be correlated. These correlation processes provide the performance metrics of the stream's transfer function.

The data taken from the first packets of a stream allow the stream to be classified. This classification associates the stream with an optimum, authorised transfer function.

The processing module which undertakes these correlation and classification processes accesses shared knowledge through the decision-making modules E2. It accesses in real time the measured characteristics of a transfer function and the global state of the Network. It can thus coordinate itself with the other decision-making modules in the network in order to adjust the operational settings of a transfer function according to a global optimisation and security policy.

In step d the processing modules E3 modify, at a remote point, the transfer function settings of a stream. In step c a decision-making module acquires the stream processing capacities available at a remote point, and adjusts the operational settings of the transfer function by remotely controlling these processing capacities, such as filtering functions to eliminate streams, protection functions to quantify streams, sequencing functions to establish priorities between streams, compression functions to reduce the resources consumed for the transfer of a stream, or again integrity functions to reduce transfer errors of a stream, or acceleration functions to reduce the transfer times of a stream.

The number of decision-making and processing modules E2, E3, and the distribution and positioning of these modules in the network's physical architecture, can be adjusted in order to achieve the ideal cost-service compromise delivered. A low-cost deployment can use a set of modules E4 incorporated into the network's routing equipment and a central unit containing a central module E1 and a decision-making module E2. Better performance is obtained by placing processing modules E3 on the periphery of the network, or at the base of the means of access, or again at the point where the collection networks join the transit network.

The method according to the invention applies, as an example, in a virtual corporate network including access equipment such as modems, routers, or all other LAN/WAN demarcation equipment. Some of this equipment will perform the observation module functions E4, whereas other equipment will be dedicated to the functions of the decision-making modules E2, or to those of the processing modules E3. The latter will be inserted in the central sites and will be able to perform both processing functions and decision-making functions, or only decision-making functions, without going beyond the scope of the invention.

The method according to the invention can also be implemented in an operator's points of presence which can include equipment dedicated to the functions of the processing modules E3 and/or decision-making modules E2 interacting with one another to form an autonomic network core which remotely controls the access equipment such as the modems, routers, or all other LAN/WAN demarcation equipment functioning as observation modules E4.

The method according to the invention can also be implemented in a Radio access network using 3GPP (3rd Generation Partnership Project) in which the Radio stations called NodeBs could perform the functions of the observation modules E4, and including decision-making modules located in the gateway to the access Network. The latter can be processing modules E3 and/or decision-making modules E2 interacting with other processing modules E3 and/or decision-making modules E2 deployed in the private virtual networks.

This distributed control/command system is designed in addition to the primary function of the Network for routing data over the network's means of transmission to reach a Consumer from a data Producer. The basic flow rules are not therefore necessarily modified. These rules are followed by the switching/routing equipment. The distributed control/command system adapts to these basic rules, but can optimise, stream-by-stream, whilst a stream exists, certain flow rules.

One of the methods to deploy this system is to insert the additional devices in the network's access interfaces.

The invention claimed is:

1. A method for managing data stream exchanges in an autonomic telecommunications network including a central module intended to establish a global policy defining the rules for transfer of streams in the network between multiple data producers $P_i$ and multiple data consumers $C_j$ connected to the network via multiple functional elements distributed across the network, where the functional elements include at least one module for processing said streams intended to optimize the settings of the stream transfer over the network, and at least one decision-making module intended to dynamically define rules for optimizing the transfer settings, the method comprising:
    inserting in the network at least one a functional element verified by the central module,
    matching the inserted functional element with the decision-making module to enable data extracted from the processed information to be moved on the fly,
    stream-by-stream dynamically matching of the inserted functional element, using the data extracted from the processed information to enable extracted data required for the distributed control to be moved on the fly, and
    stream-by-stream aligning of the data transfer processing settings with settings taken from processing of extracted data required for the distributed control;
    wherein the method further comprises a first phase consisting of:
    (a) extracting through the processing modules of each stream exchanged across the network routing data and measuring data of the transfer function between at least one data producer $P_i$ and at least one data consumer $C_j$,
    (b) sharing the extracted routing data with the decision-making modules,
    (c) selecting at least one decision-making or processing module so that the access time to the measuring data of the transfer function is minimal,
    and a second phase consisting of:
    (d) dynamically defining by at least one of the selected modules for optimizing the stream transfer settings according to the measuring data,
    (e) selecting processing modules located on the path of said streams in order to apply said rules such that the stream transfer function is made consistent with the global stream exchange policy defined by the central module, and
    (f) applying said rules by the modules selected in step (e); wherein steps (a) and (f) are also executed by at least one observation module of said streams, situated between at least one data producer $P_i$ and at least one data consumer $C_j$, where the observation module is either the first module traversed by this stream, or the last module traversed before reaching the consumer of this data stream $C_j$ and wherein the method further comprises:
    exchanging routing and measuring data with the decision-making modules and the processing modules,
    recognizing starts and ends of streams,
    calculating a signature associated with a data packet,
    temporarily storing headers of data packets and time-stamped signatures,
    calculating elementary metrics of the exchanged stream, and adapting the said stream using rules defined dynamically by the decision-making module.

2. A method according to claim 1, in which, for a given observed stream, the processing or observation modules selected in step e) are respectively the first module traversed by this stream observed from its producer, and the final module traversed before reaching the consumer.

3. A method according to claim 2, in which, for a given stream, if this stream traverses only a single module between the producer and the consumer, then the traversed module is selected.

4. A method according to claim 1, in which the processing module filters the streams exchanged in the network according to a security policy defined by the central module.

5. A method according to claim 1, in which the observation module filters the streams exchanged in the network according to a security policy defined by the central module.

6. A method according to claim 1, in which the processing module:
    extracts characteristic data of said stream such as the behavioural signature, metrics or identification data, and directly modifies the transfer settings of said stream according to the extracted characteristic data.

7. A method according to claim 1, in which the decision-making module:
    collects the characteristic data of said stream extracted by the modules selected in step (e),
    processes said data to detect changes requiring that new action rules, to be imposed on the selected module, are defined.

8. A method according to claim 4, in which the processing module also performs at least one of the following operations:
    selecting an output interface for said stream, configuring said stream in terms of the sequencing of the streams, compressing said stream, and modifying the protocol elements to accelerate the transfer of said stream.

9. A device for managing data stream exchanges in an autonomic telecommunications network including a central module intended to establish a global policy defining the rules for transfer of streams in the network between multiple data producers $P_i$ and multiple data consumers $C_j$ connected to the network via multiple functional elements distributed across the network, where said functional elements include at least one module for processing said stream intended to optimize the settings of the stream transfer over the network, and at least one decision-making module intended to define rules for dynamically optimizing the transfer settings, the device comprising:

means for inserting in the network at least one a functional element verified by the central module, means for matching the inserted functional element with the decision-making module to enable data extracted from the processed information to be moved on the fly, means for stream-by-stream dynamically matching of the inserted functional element, using the data extracted from the processed information to enable extracted data required for the distributed control to be moved on the fly, and means for stream-by-stream aligning of the data transfer processing settings with settings taken from processing of extracted data required for the distributed control;

means for extracting from each stream exchanged across the network routing data and measuring data of the transfer function between at least one data producer $P_i$ and at least one data consumer $C_j$, means for sharing the extracted routing data between the decision-making modules, means for selecting at least one decision-making module so that the access time to the measuring data of the transfer function is minimal, wherein the selected decision-making module includes:

at least one stream observation module incorporated in the network's routing equipment, and including:

means for exchanging data with all the decision-making modules and all the processing modules, means for recognizing the starts and ends of each stream traversing them, means for calculating a packet signature, means for temporarily storing packet headers and time-stamped signatures, means for calculating the stream's elementary metrics, means for adapting the streams traversing them according to elementary rules established dynamically for each stream by the decision-making modules and the processing modules, means to define dynamically said rules for optimizing the transfer settings of the stream according to said measuring data, and means for selecting at most two processing modules in order to apply said rules such that the stream transfer function is made consistent with the global stream exchange policy defined by the central module.

10. A device according to claim 9, in which said stream observation modules are adapted to provide the data extracted from a stream traversing them at the request of a decision-making or processing module, and to receive by return from this requesting module settings for processing said stream.

11. A device according to claim 9, in which the decision-making modules are able to synchronize themselves with one another to constitute a shared database which can be interrogated by all the decision-making modules and all the processing modules distributed across the network.

12. A device according to claim 9, in which the decision-making modules and the processing modules are capable of interacting to coordinate their respective actions, and to take decisions stream-by-stream.

13. A device according to claim 10, characterized in that said observation modules and said processing modules include two types of interface, namely a first type A and a second type B, where the streams traverse an observation module or a processing module from a type A (respectively B) interface, and exit by a type B (respectively A) interface, and in that, in the type A interfaces, the origins of the streams can be associated with the observation modules and with the processing modules by self-learning or by configuration rules, and in the type B interfaces, the destinations of the streams can be associated with the observation modules and with the processing modules by self-learning or by configuration rules.

* * * * *